United States Patent

[11] 3,557,883

[72] Inventor Benjamin A. Shader
       Golden, Colo.
[21] Appl. No. 749,458
[22] Filed Aug. 1, 1968
[45] Patented Jan. 26, 1971
[73] Assignee The Eversman Mfg. Company
       Denver, Colo.

[54] SEED BED FORMING IMPLEMENT
     6 Claims, 8 Drawing Figs.
[52] U.S. Cl. ................................................. 172/701,
                                                             172/741
[51] Int. Cl. ..................................................... A01b 13/02
[50] Field of Search........................................... 172/245,
       252, 654, 656, 694, 697, 701, 719, 121, 157, 175,
       176, 188, 253, 254, 303, 413, 519, 538, 697, 701,
                                                    741; 118/85

[56] References Cited
       UNITED STATES PATENTS
| | | | |
|---|---|---|---|
| RE25,439 | 9/1963 | Mostrong...................... | 172/697X |
| 3,128,833 | 4/1964 | Johnson et al. ................ | 172/245 |
| 3,187,822 | 6/1965 | Clifford et al.................. | 172/701 |
| 3,252,522 | 5/1966 | Taylor............................ | 172/519X |
| 3,437,061 | 4/1969 | Wells............................. | 111/6X |

*Primary Examiner*—Robert E. Pulfrey
*Assistant Examiner*—James W. Peterson
*Attorney*—R. H. Galbreath

ABSTRACT: A plurality of elongated panels selectively and detachably joined together in end-to-end relation to form an elongated, flat-bottomed bed-leveling element, of any desired length, which is positioned across and drawn along a plurality of plant rows, said panels having upturned forward and rear edges to which downwardly-extending furrow-forming shells are clamped in adjustable spaced-apart relation.

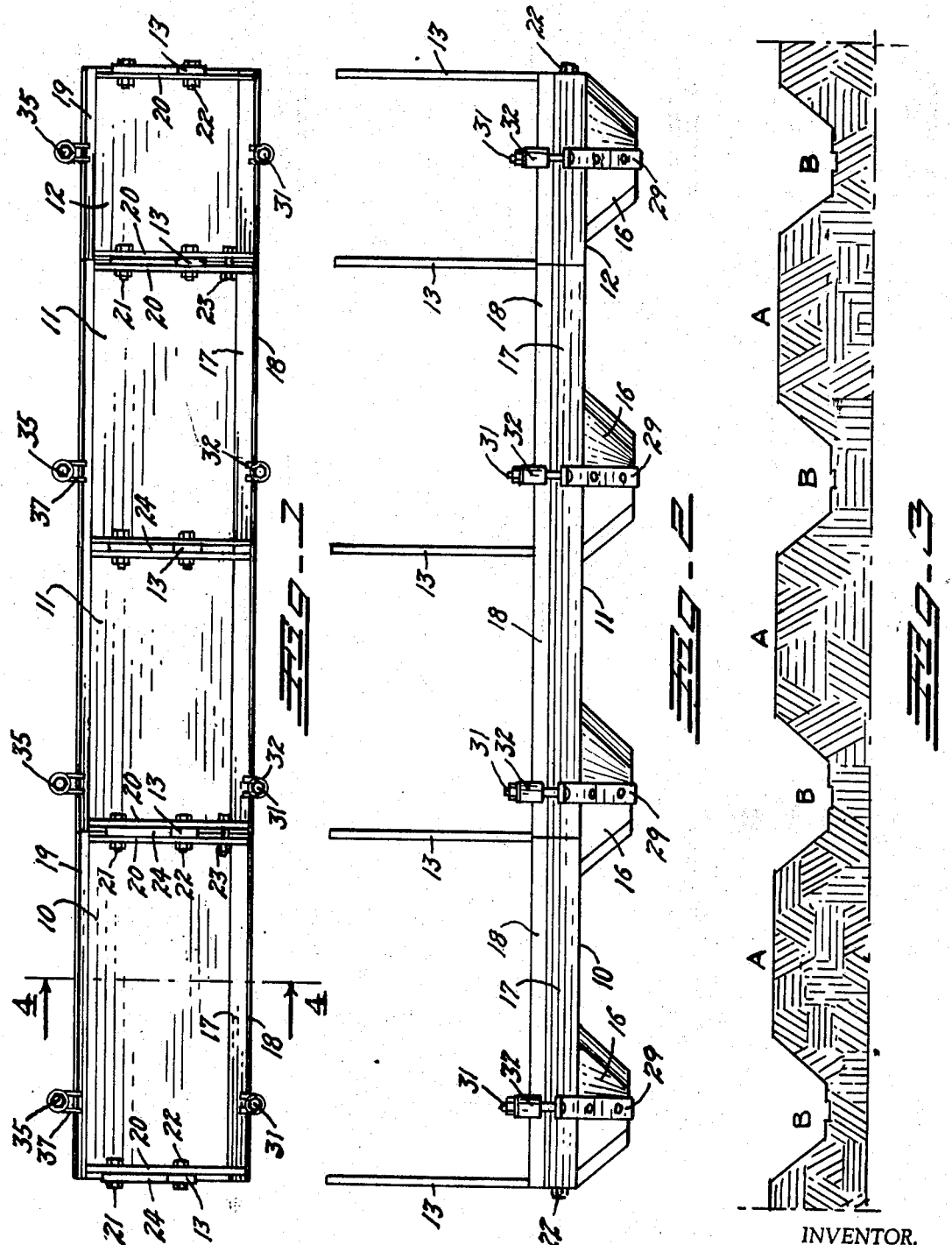

PATENTED JAN 26 1971 3,557,883

INVENTOR.
BENJAMIN A. SHADER
BY
ATTORNEY

SEED BED FORMING IMPLEMENT

This invention relates to a seedbed-forming implement for attachment to the tool bar of conventional agricultural tractor assemblies for forming and compacting parallel hills and furrows in accurate alternating relation in the field surface.

Prior devices have been used for this purpose but they have, in the main, been predesigned for use for a particular number of rows. They have been useful when the same field is seasonally prepared to receive the same crop year after year.

The principal object of this invention is to provide a simple and highly efficient custom bed-forming implement for the above purpose which can be quickly and easily adapted to conditions encountered in various fields for various crops.

A further object is to provide a highly efficient seedbed-forming implement for the above purpose having a minimum of parts which can be quickly preset to cover any desired number of rows at each pass.

A still further object is to so construct the implement that it can be adjusted while in place to any desired row spacing without dismantling or disturbing the attachment of the implement to the tool bar or tractor.

Other objects and advantages reside in the detail construction of the invention, which is designed for simplicity, economy and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a top plan view of the improved seedbed-forming implement as it would appear when adjusted for three-row operation;

FIG. 2 is a front elevational view of the implement of FIG. 1;

FIG. 3 is a diagrammatic cross section of a field, showing the type of seedbed produced by the implement of this invention;

Figure 4:
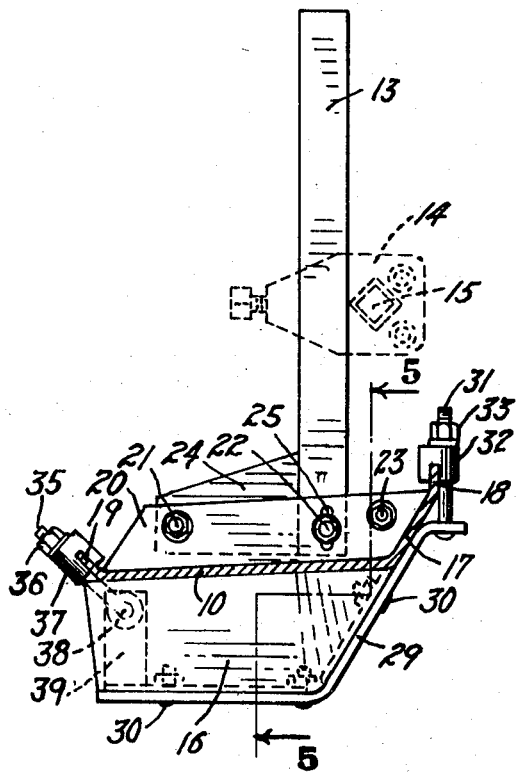
FIG. 4 is an enlarged cross section, taken on the line 4-4, FIG. 1.
Figure 5:
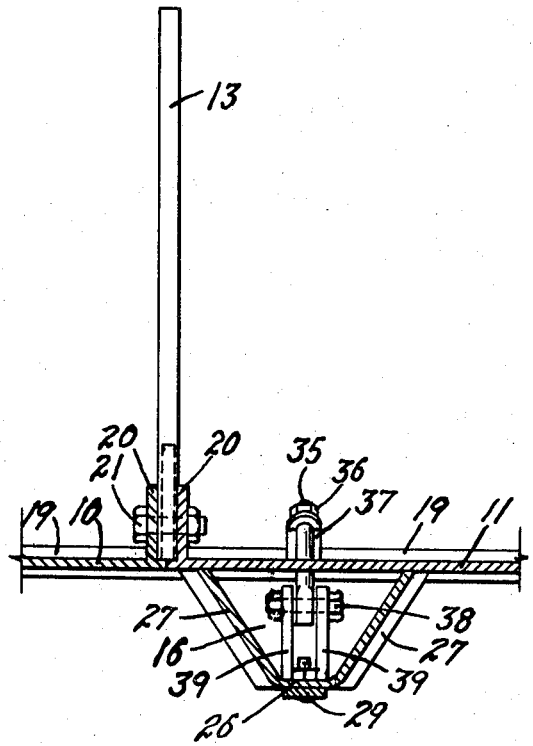
FIG. 5 is a similarly enlarged, fragmentary, longitudinal section, taken on the line 5-5, FIG. 4.

Briefly, the implement comprises a plurality of elongated, flat-bottomed, bed-forming panels of various lengths, such as shown, for instance, at 10, 11 and 12, joined together in end-to-end relation to form an elongated, horizontal, bed-leveling element or screen of sufficient length to extend laterally, completely and continuously over any desired number of plant rows. The joined panels are horizontally suspended, through the medium of upstanding standards 13, which are clamped, as indicated at 14, to the tool bar 15 of a conventional tractor hitch, as is customary with tractor-drawn tools. A plurality of furrow-forming shells 16 are adjustably attached below the joined panels in spaced-apart relation corresponding to the row spacing of the expected crop.

Each of the panels 10, 11 and 12 comprises a flat steel plate having its forward edge portion turned upwardly at an angle of substantially 55° to form a forwardly extending, earth-flattening portion 17, and the upper edge of the flattening portion 17 extends vertically upward to form a front attachment flange 18. The rear edge of the plate is also turned upwardly to form a rear attachment flange 19. The flanges 18 and 19 extend throughout the full length of the plates and terminate at their extremities in terminal, upstanding, connecting plates 20 which extend transversely across the extremities of the panels in inset relation to the ends thereof so as to be in parallel, spaced relation when the said ends are in abutting relation.

The connecting plates 20 are drilled to receive a pivot bolt 21, an angle adjusting bolt 22 and a clamp bolt 23, by means of which the abutting ends of adjacent panels are clamped together with the adjacent panels in aligned relation. The pivot bolts 21 extend through foot plates 24 on the standards 13 and the adjusting bolts 22 extend through the standards and through arcuately elongated bolt holes 25 in the connecting plates 20 so the bed-forming panels 10, 11 and 12 may be preset at an upwardly inclined angle, for instance, 5° 15' to the horizontal, as shown in FIG. 4. As before stated, the panels are formed in various lengths so that they may be assembled to form leveling elements of any desired length. The longer panels are provided with intermediate connecting plates, as shown at 20' in FIG. 1, so that an additional standard 13 may be attached for additional support.

Figure 6:
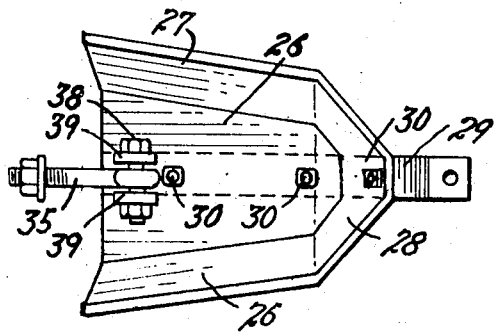
FIG. 6 is a detail, plan view looking downwardly upon a furrow-forming shell, to be later described.

Each of the furrow-forming shells 16 comprises a hollow, hull-shaped shell having an open top and an open stern portion. The hull-shaped shell is provided with a bottom plate 26 of less width at its forward extremity than at its rearward extremity, as shown in FIG. 6. An outwardly inclined side plate 27 is welded to, and extends upwardly from, each of the two sides of the bottom plate. The side plates 27 increase in vertical width, and approach each other as the forward extremity of the bottom plate 26 is approached. A prow plate 28 is welded between the forward extremities of the two side plates 27 and the forward extremity of the bottom plate 26, to form inclined prows on the hull-shaped shells 16.

Figure 7:
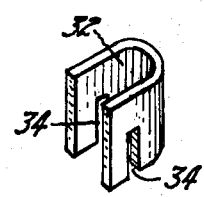
FIG. 7 is a detail, perspective view of a flange-attachment clip as used for adjustably securing the shell of FIG. 6 in place on the implement.

An elongated runner strip 29 is medially attached beneath the bottom plate 26, by means of suitable countersunk bolts 30, and extends first forwardly, thence upwardly and forwardly to a position above the prow plate 28 so that, when assembled, it may lie against the earth-flattening portion 17. The forward extremity of the runner strip 29 extends horizontally forward and is drilled to receive a clamp bolt 31 which extends upwardly through a U-shaped, flange-attachment clip 32 into a clamp nut 33. The flange-attachment clip, shown in detail in FIG. 7, partially surrounds the bolt 31 and is provided with flange-receiving notches 34 which fit over and engage the front attachment flange 18 to support the forward extremity of each furrow-forming shell 16. The rear extremity of each shell 16 is supported by an eyebolt 35, which is also provided with a clamp nut 36 and with a notched attachment clip 37, similar to the clip 32, the notch of which engages the rear attachment flange 19 of the assembled panels. The eye of the eyebolt 35 is hingedly mounted on a hinge bolt 38 extending between two vertical supporting straps 39 welded to and extending upwardly from adjacent the rear of the bottom plate 26 of each shell 16.

To adapt the bed-forming implement to the conditions encountered in a particular field, a plurality of various-length panels are assembled to provide a bed-leveling element of sufficient length to extend completely across all of the rows to be formed at each pass of the tractor. The furrow-forming shells are then attached below the assembled bed-leveling element in uniform, spaced relation corresponding to the row spacing desired in the particular field. It can be seen that, when the nuts 33 and 36 are loosened, the furrow-forming shells can be slidably adjusted along the completely assembled bed-leveling element to accommodate any desired row spacing, and can then be locked in their adjusted positions by simply tightening the nuts 33 and 36. The aligned, upwardly projecting standards 13 are now clamped to the conventional tool bar of the tractor hitch at the proper height for vertical control of the assembly by the driver.

As the implement travels along the rows, the inclined, earth-flattening portion 17 of the assembled panels, and the incline of the panels themselves, accomplished by adjustment of the bolts 22 in the elongated bolt holes 25, will press and compact the surface earth downwardly to a flat, compacted layer of earth the full width of the multiple rows to form level-topped hills, as indicated at A in FIG. 3. The compaction pressure is controlled by the tractor driver through manipulation of the conventional three-point tool-bar mounting. The furrow-forming shells 16 will travel forwardly in the compacted layer to urge the earth oppositely sideward to form parallel furrows B having smooth, compacted sides and bottoms.

In actual practice, it has been found that panels of three differing lengths, to wit, 24 inches, 44 inches and 72 inches can be conveniently combined in various combinations to produce a bed-leveling element of any desired length to provide a unitary support for any desired number of furrow-forming shells.

Furrow-forming elements have been heretofore attached to tool bars and cover plates have been attached to and extended between the furrow-forming elements. This made it impossible to vary and adjust the row spacing without removing and replacing the cover plates. In the present invention the row spacing can be quickly and easily varied and adjusted by simply loosening the nuts 33 and 36 and sliding the shells along the bed-leveling element to the desired positions without interference with or adjustment of the elongated leveling element.

Figure 8:
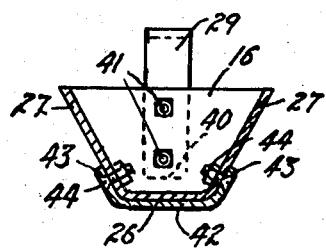
FIG. 8 is a cross-sectional view of an alternate form of the furrow-forming shell.

It has been found that when used in particularly abrasive ground, the longitudinally-extending edge bends of the shells and the bottoms thereof rapidly wear away. For use in such cases, the runner strip 29 is terminated at the bottom of the prow of the shell, as indicated in broken line at 40 in the alternate form of FIG. 8, and is secured to the prow only by suitable attachment bolts 41. A renewable bottom plate 42, corresponding in contour to the bottom of the shell and having angularly upturned side flanges 43, is then positioned below the bottom plate 26 of the shell and the side flanges 43 are bolted to the side plates 27 by means of suitable countersunk attachment bolts 44. When sufficient wear occurs, the plate 42 can be quickly and easily renewed.

While a specific form of the invention has been described and illustrated herein, it is to be understood that the same may be varied, within the scope of the appended claims, without departing from the spirit of the invention.

I claim:

1. An implement for forming seed beds, of the type having parallel, flat-topped hills separated by parallel, flat-bottomed furrows, comprising:
    a. an elongated, flat-bottomed, bed-leveling element of sufficient length to extend laterally across a plurality of plant rows to level said hills and consisting of a plurality of panels of various lengths secured together in aligned end-to-end relation;
    b. means for supporting said leveling element in a laterally horizontal position from the tool bar of a towing vehicle and across said plurality of plant rows;
    c. a plurality of furrow-forming shells supported by, and longitudinally adjustable along, said bed-leveling element;
    d. means for locking said shells to said bed-leveling element in any desired spaced-apart relation;
    e. an upwardly extending forward attachment flange along the forward edge of said leveling element;
    f. an upwardly extending rear attachment flange along the rear edge of said leveling element; and
    g. means for clamping the forward and rear extremities, respectively, of said furrow-forming shells to said forward and rear attachment flanges.

2. An implement for forming seed beds as described in claim 1 in which said furrow-forming shells comprise:
    a. hollow, hull-shaped shells having open tops, open sterns and prow-shaped forward extremities; and
    b. a medially positioned, elongated runner strip secured below the bottom of each shell and extending medially forward and upward on said prow-shaped forward extremity.

3. An implement for forming seed-beds as described in claim 1 in which the means for attaching the forward extremities of said furrow-forming shells comprises:
    a. a medially positioned, elongated runner strip secured to and extending forwardly along the bottom of each shell and upwardly and forwardly thereof;
    b. a clamp bolt extending through and upwardly from the forward extremity of said runner strip;
    c. an attachment clip mounted on said bolt and engaging the front attachment flange of said leveling element; and
    d. a nut threaded on said bolt and urging said clip into engagement with the front attachment flange.

4. An implement for forming seedbeds as described in claim 1 in which the means for attaching the rear extremities of said furrow-forming shells comprises:
    a. a hinged bolt hingedly mounted at the rear of each shell and extending rearwardly and upwardly therefrom;
    b. an attachment clip mounted on said hinged bolt and engaging the rear attachment flange of said leveling element; and
    c. a nut threaded on said hinged bolt and urging said clip into engagement with said rear attachment flange.

5. An implement for forming seedbeds as described in claim 1 in which said furrow-forming shells comprise:
    a. hollow, hull-shaped shells having open tops, open sterns and prow-shaped forward extremities;
    b. a medially positioned, elongated runner strip secured to an extending forwardly from the bottom of each shell and upwardly and forwardly thereof;
    c. a clamp bolt extending through and upwardly from the forward extremity of said runner strip;
    d. an attachment clip mounted on said clamp bolt and engaging the front attachment flange of said leveling element;
    e. a hinged bolt hingedly mounted at the rear of each shell and extending rearwardly and upwardly therefrom;
    f. a second attachment clip mounted on said hinged bolt and engaging the rear attachment flange of said leveling element; and
    g. a nut threaded on each of said bolts and urging the attachment clip thereon into engagement with its respective attachment flange.

6. An implement for forming seedbeds as described in claim 5 having:
    a. a renewable bottom plate corresponding in outline to and positioned below the bottom of each shell;
    b. upwardly-turned side flanges on said renewable bottom plate engaging the sides of said shell; and
    c. attachment bolts securing said flanges to the sides of said shell.